June 25, 1968  E. A. FILIPPI ETAL  3,389,873

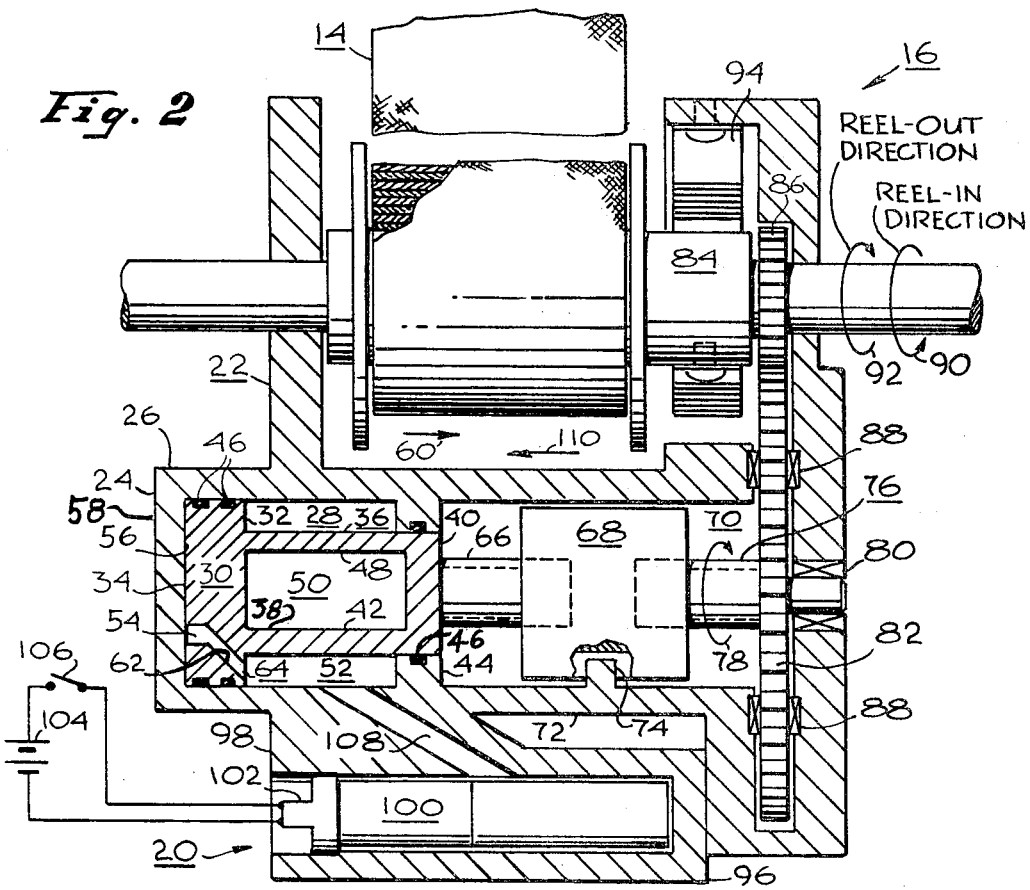

HARNESS REEL ARRANGEMENT

Filed March 28, 1966  2 Sheets-Sheet 2

INVENTORS
ERNEST A. FILIPPI
DONALD H. HERBERT
BY
Don Finkelstein
ATTORNEY

United States Patent Office 3,389,873
Patented June 25, 1968

3,389,873
HARNESS REEL ARRANGEMENT
Ernest A. Filippi, Northridge, and Donald H. Herbert, Rolling Hills Estates, Calif.; said Filippi assignor to Special Devices, Inc., a corporation of California
Filed Mar. 28, 1966, Ser. No. 549,738
(Filed under Rule 47(a) and 35 U.S.C. 116)
9 Claims. (Cl. 242—107.2)

This invention relates generally to an improved harness strap steel reel arrangement and more particularly to an improved harness strap reel arrangement for providing protection to occupants of moving vehicles when the occupants are subjected to sudden, high acceleration forces.

In many high speed vehicles, such as airplanes, race cars, boats and the like, it is often necessary that the occupants thereof be firmly braced in his seat when sudden acceleration forces, such as those encountered in crashes, turns, ejection or other maneuvers are encountered. Systems to provide this protection have generally included a body harness that is worn by the occupant. The harness is connected to a strap which in turn is connected to a reel. The reel provides a constant tension on the strap, but allows comparatively freedom of movement of the wearer under non-emergency conditions.

Under a first class of emergency conditions, the strap is locked in whatever condition of extension from the reel it may be. Examples of conditions falling within the first class would include those associated with high speed turns, catapult take-offs, carrier landings, abrupt maneuvers, and the like. Such locking of the strap is preferably inertia operated with a manual override so that it may be manually operated by the wearer of the harness when desired.

A second class of emergency conditions includes those conditions having generally, the potential for more severe forces on the occupant, such as ejection from an ejection seat, crashes, and the like. Protection during these conditions is usually preferred to be a command function by the occupant and in such conditions, it is desired that the strap be wound completely upon the reel in order to pull the harness and the wearer thereof firmly into and against the seat that the wearer occupies. Such command function during such emergencies preferably precedes the actuation of the lock mechanism whereby the wearer is first pulled firmly back into his seat and the lock is then positively actuated, either automatically or by the wearer, to insure firm retention of the strap to retain the occupant in a braced position.

Since the occupant wearing the harness will be subjected to certain forces transmitted from the harness during the windup of the strap to brace the wearer upon actuation of the reel, such acceleration forces must be those that the wearer can withstand without harm. Further, since different persons at different times may wear the harness and thereby impose different loading conditions upon the reel, it has long been desired to provide a reel in which the acceleration is not violent and a substantially constant velocity is achieved during a predetermined portion of the movement of the reel.

To the best of applicant's knowledge, prior art harness reel arrangements have not always been able to provide the above desiderata.

Accordingly, it is an object of applicant's invention herein to provide an improved harness strap reel arrangement.

It is another object of applicant's invention herein to provide an improved reel for utilization in a harness strap reel arrangement.

It is yet another object of applicant's invention herein to provide an improved harness strap reel that achieves a substantially constant angular velocity during predetermined portions of the reel actuation.

The above and other objects of applicant's invention are achieved, according to one aspect of applicant's invention, by providing a gas powered actuator that provides substantially constant velocity during a predetermined portion of the stroke of the actuator as the prime means for moving the harness reel. Such a gas powered actuator is preferably similar to the gas powered actuator described in applicant's co-pending patent application, Ser. No. 549,736, filed concurrently herewith.

The gas powered actuator provides a linear motion during a predetermined portion of the stroke thereof and the improved harness reel of applicant's invention herein incorporates a means, such as a recirculating ball means, for converting the linear motion of the gas powered actuator during the stroke thereof to rotary motion. This rotary motion is transmitted to an output shaft which in turn rotates a gear train to rotate a strap shaft upon which a harness strap is wound.

During the predetermined portion of the stroke of the actuator, wherein there is provided a substantially constant velocity of the actuator, it will be appreciated that the strap shaft is rotated at a substantially constant angular velocity.

In this embodiment of applicants inventory, there is also provided a spring means coupled to the strap shaft to provide a yielding resistance to rotation of the strap shaft under reel-out conditions, that is, when the strap is extending from the harness reel, and substantially no retarding force is applied by the spring to the strap shaft during the reel-in, that is, when the gas powered actuator is energized to rotate the strap shaft. The strap that is wound upon the strap shaft passes through an inertia lock device which, according to the preferred embodiment of applicant's invention, is similar to the inertia lock described in co-pending patent application, Ser. No. 549,737, filed concurrently herewith.

The remote end of the strap is connected to the body harness that is worn by the occupant of the vehicles in which the harness reel arrangement is utilized. During normal motions of the wearer of the harness, the spring means that yieldingly resists extension of the strap from the reel provides a predetermined tension in the strap and takes up all slack therein.

However, when emergencies falling within the first classification above-described occur, the strap lock is actuated, either automatically or manually by the occupant, in order to restrain the strap from further movement. But where conditions falling within the second class above-described occur, such as an imminent crash, ejection, or the like, the wearer of the harness, by a manually operated command signal, initiates actuation of the harness reel to reel in the strap.

Thus, such a command signal may energize a pyrotechnic charge of the type adapted to produce gas under pressure during rapid deflagration thereof. The gas from the deflagrating pyrotechnic charge is ducted into the gas powered actuator and operates the gas powered actuator to reel in the strap.

Thus, such a command signal may energize a pyrotechnic charge of the type adapted to produce gas under pressure during rapid deflagration thereof. The gas from the deflagrating pyrotechnic charge is ducted into the gas powered actuator and operates the gas powered actuator to reel in the strap.

As noted above, during the reel-in there is achieved a substantially constant angular velocity of the shaft upon which the strap is wound and, consequently, a substantially constant linear velocity of the strap, the only change being a comparatively minor one due to the increased diameter of winding as the strap is wound upon the shaft. A substantially constant winding velocity of the strap reduces the possibility of injury to the wearer of the harness due to high acceleration forces caused by too rapid a reel-in which, in prior art harness reels, were often encountered.

Subsequently to energizing the harness reel, the wearer of the harness may also desire to energize the strap lock to provide a locked condition of the strap during the imminent emergency condition.

The above and other embodiments of applicant's invention are explained in greater detail in the following description taken together with the accompanying drawing wherein similar reference characters refer to similar elements throughout and in which:

FIGURE 1 is a schematic diagram of a harness reel arrangement according to applicant's invention herein;

FIGURE 2 is a sectional view of a gas powered actuator harness reel;

FIGURE 3 is a graph illustrating performance curves of the gas powered actuator harness reel illustrated in FIGURE 2;

Figure 4:
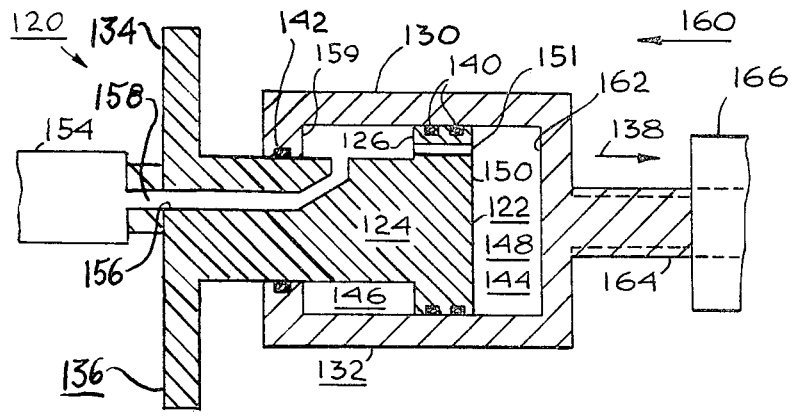
FIGURE 4 illustrates another embodiment of applicant's invention.

Before detailing the description of applicant's invention presented herein, applicant points out that the drawings and specification as herein presented describe the preferred embodiment of applicant's invention. Accordingly, the details of the structure as shown and described are not intended to be limiting to applicant's invention but are presented for illustrative purposes only.

Referring now to FIGURE 1, there is shown a schematic diagram of a harness reel arrangement, generally designated 10, according to applicant's invention herein. As shown thereon, the harness reel arrangement 10 generally includes a body harness 12 to which there is attached a strap or belt means 14. The body harness 12 is of the type that is adapted to be worn by the occupant of, for example, a vehicle to provide a restraint to movements of the occupant during certain particular operational conditions. The remote end of the strap 14 is connected to a reel 16 and passes through a strap lock 18 that is positioned intermediate the reel 16 and the harness 12. In this embodiment of applicant's invention, the reel 16 is operated by a gas powered actuator 20.

In the preferred embodiment of applicant's invention, the strap lock 18 takes the form of the strap lock described in co-pending patent application, Ser. No. 549,737, filed simultaneously herewith. As such, the strap lock 18 preferably has two modes of operation: A first mode that is automatic; that is, upon subjection to certain preselected external forces acting upon the strap lock 18 the strap lock is actuated to engage the strap 14 and prevent linear movement thereof; and a second mode of operation of the strap lock 18 that is manual operation; that is, where the wearer of the harness 12 intentionally actuates the strap lock 18 to restrain linear movement of the strap 14.

The reel 16 provides a means for normally maintaining a predetermined tension in the strap 14 so that slack does not appear between the harness 12 and the reel 16. However, when certain emergency or other extremely violent maneuvers are anticipated by the wearer of the harness 12, such maneuvers, of course, being, for example, the ejection from a high speed vehicle, or the like, the wearer of the harness 12 energizes the gas powered actuator to drive the reel 16 which winds the strap 14 thereupon to move the harness 12 closer to the reel 16. By this actuation the wearer of the harness 12 is firmly held by the harness in the seat occupied by the wearer and the strap 14 is under tension provided by the gas powered actuation of the reel.

Referring now to FIGURE 2 there is shown the structure associated with a preferred embodiment of applicant's improved gas-powered actuator 20 and reel 16. The gas-powered actuator 20 is generally similar, in the preferred embodiment of applicant's invention, to the gas powered actuator described in applicant's patent application Ser. No. 549,736, filed concurrently herewith, and generally includes a housing 22 having first wall portions 24 defining a cylinder portion 26 having a cavity 28 therein. A piston 30 is slidingly mounted in the cavity 28 for reciprocal motion and the piston 30 has a first side 32 and a second side 34.

A stem means 36 has a first end 38 coupled to the first side 32 of the piston 30 and a second end 40 external the cylinder 26. The stem means 36 has a body portion 42 intermediate the first end 38 and the second end 40 thereof and the body portion 42 slidingly engages second wall portions 44 of the housing 22 for sliding sealing engagement therewith as may be provided, for example, by O-ring 46. Similarly, the piston 30 may be provided with sealing means 46 such as the O-rings shown on FIGURE 2, to provide sliding seal engagement of the piston 30 with the first wall portions 24 of the cylinder 26 during linear movement of the piston 30 with respect to the cylinder 26.

The stem means 36 may, if desired, be provided with wall portions 48 defining an internal cavity 50. The internal cavity 50 in the stem means 36 is merely provided for lightening of the stem and piston combination in order to provide a more rapid response thereof upon actuation.

The piston 30 may, therefore, be considered as dividing the cavity 28 of the cylinder 26 into a stem chamber 52 that is the volume in the cavity 28 adjacent the first side 32 of the piston 30 and a driving chamber 54 that is the volume in the cavity 28 adjacent the second side 34 of the piston 30. That is, the driving chamber 54 is the entire volume occupied at any time and for any position of the piston 30 between the second side 34 of the piston 30 and the internal surface 56 of the end wall 58 of the first wall 24 defining the cylinder 26. It will be appreciated that as the piston 30 moves in the direction indicated by the arrow 60 the volume between the surface 56 and the second side 34 of the piston 30 increases. Further, as shown on FIGURE 2, the stem chamber 52 is sealed from the driving chamber 54 by the O-rings 46 along the periphery of the piston 30. There are wall portions 62 in the piston 30 defining an orifice 64 that provides a gas flow passage between the stem chamber 52 and the driving chamber 54. The area of the orifice 64 is carefully selected in a manner set forth below.

In the embodiment of applicant's invention shown in FIGURE 2, the piston 30 and stem 36 are adapted to move unilaterally in the direction indicated by the arrow 60 upon actuation.

The second end 40 of the stem means 36 is connected to a threaded shaft means 66 that engages a motion converter means 68. The motion converter means 68, may, for example, be a conventional recirculating ball drive arrangement that is restrained from rotating in a drive chamber 70 defined by third wall portions 72 of the housing 22 by the projection 74 thereof. Such a recirculating ball drive arrangement may be of the type manufactured by Saginaw Products Corp., Model No. 5707506 Ball Bearing or may be any other type of motion converter that is adapted to receive the linear motion provided by the threaded shaft 66 and convert that linear motion into rotary motion.

An output shaft 76 also engages the motion converter 68 and is adapted to rotate in the direction indicated by the arrow 78 upon linear motion of the threaded shaft 66 in the direction indicated by the arrow 60. Thus, the motion converter means 68 converts the linear motion of the threaded shaft 66 into rotary motion of the output shaft 76. The output shaft 76 is journaled for support in bearings 80 and is also connected to gear means 82 driving pinion means 86 to provide a gear train between the output shaft 76 and a strap shaft 84 upon which the strap 14 is wound. It will be appreciated, of course, that any type of gear train may be provided between the output shaft 76 and the strap shaft 84, the gear 82 and pinion 86 having been selected by applicant as structure illustrating one means for transferring the rotary motion of the output shaft 76 to the strap shaft 84.

In the embodiment of applicant's invention shown in FIGURE 2 there may also be provided thrust bearings 88 to absorb axial loadings on the gear means 82.

Since only one gear and one pinion are shown between the output shaft 76 and the strap shaft 84, there is a reversal of direction of rotation between the two shafts and thus upon actuation of the gas-powered actuator 20 providing rotation of the output shaft 76 in the direction of the arrow 78 the strap shaft 84 is rotated in the reel-in direction indicated by the arrow 90.

As noted above, in normal operation of the improved harness reel arrangement 10 illustrated on FIGURE 1, the strap 14 is adapted to reel out from the strap shaft 84 in the direction indicated by the arrow 92 during movements of the wearer of the harness 12. The reel-out of the strap 14 from the strap shaft 84 is yieldingly resisted by, for example, a coil spring means 94 that is coupled to the housing 22 and the strap shaft 84 to yieldingly resist rotation of the strap shaft 84 in the direction indicated by arrow 92. The spring 94 may take the form of a conventional helically wound spring means for yieldingly resisting such reel-out motions of the strap 14. However, the spring means 94 provides no restraint to reel-in motions of the strap shaft 84 in the direction indicated by the arrow 90. As shown on FIGURE 2, the strap shaft 84 is journaled for rotary motion in the housing 22. It will be appreciated, however, that the strap shaft 84 may equally well be mounted for rotary motion in other structures so long as there is provided a means for transferring the rotary motion from the output shaft 76 to the strap shaft 84.

The housing 22 also has fourth wall portions 96 defining a pyrotechnic container 98 in which there is provided a pyrotechnic charge 100. The pyrotechnic charge 100 is of the type that is adapted to rapidly deflagrate upon ignition to provide a high pressure gas. Such a pyrotechnic charge may be of a composition such as: Hercules Powder Co., Salt Lake City, Utah: HPSK 5250.95, 7 perforation; "High Temp" propellant, and "Bullseye" pistol powder; Special Devices, Inc., Newhall, California: 500338 Propellant and 500309 Ignition Composition; and Amoco, Division of Standard Oil Co. of New Jersey, LF T-3 propellant, blended to give the desired burning characteristic.

An igniter 102 is provided in the pyrotechnic container 98 and may be of the type that is adapted to be electrically energized through a source of electrical energy such as a battery means 104 by a command signal provided when the wearer of the harness 12 closes the switch 106. Upon such a command signal, the igniter 102 ignites the pyrotechnic charge 100 which commences a rapid deflagration to provide a high pressure gas as one of the products thereof.

The first walls 24 defining the cylinder 26 are also provided with an aperture 108 therethrough to provide a gas flow path between the interior of the container 98 and the stem chamber 52. As the gas under pressure enters the stem chamber 52 there is a force exerted on the first side 32 of the piston 30 in the direction indicated by the arrow 110. Simultaneously, the gas under pressure bleeds through the orifice 64 to the driving chamber 54 and exerts a force on the second side 34 of the piston 30 in the direction of the arrow 60. In addition there are frictional forces acting on the piston 30 and stem 36 tending to resist motion in the direction of the arrow 60 and these together with load forces all act in the direction of the arrow 110.

Since the area of the second side 34 of the piston 30 is greater than the area of the first side 32 of the piston 30 (the difference being the area of the stem 36) a larger force on the second side 34 of the piston 30 will be exerted by the gas under pressure in the driving chamber 54 than the force on the first side 32 of the piston 30 due to the gas in the stem chamber 52. When the force exerted on the second surface 34 of the piston 30 due to the gas in the driving chamber 54 in the direction indicated by the arrow 60 is greater than the sum of the forces acting on the piston 30 and the stem 36 in the direction indicated by the arrow 110 the piston 30 commences movement in the direction indicated by the arrow 60. The piston is, therefore, accelerating during this initial portion of its stroke and its velocity is, of course, increasing during this portion of the stroke. However, for a given set of operating conditions, the forces acting on the piston 30 and stem 36 tend to equalize to achieve an equilibrium condition wherein the force acting on the piston 30 in the direction indicated by the arrow 60 just equals the sum of the forces acting on the piston 30 and the stem 36 in the direction indicated by the arrow 110. For such an equilibrium condition, the pressure of the gas in the driving chamber 54 is equal to or less than .528 times the pressure in the stem chamber 52. This is generally termed a "choked" condition for the orifice 64 and, under these conditions, the piston is moving at a substantially constant velocity and is not accelerating. Once this equilibrium condition is achieved, therefore, the piston will move in a substantially constant velocity in the direction indicated by the arrow 60 for the preselected portion of the stroke thereof until the piston 30 reaches the end of its travel when it abuts against the second wall portion 44. If there were to be a slight override of the velocity as it tends to achieve the substantially constant velocity there is a compression of the gas in the stem chamber 52 and an expansion of the gas in a driving chamber 54 and the gas will consequently expand in the driving chamber 54 to lower the pressure thereof and reduce the excess force. This is a highly damped transitory oscillation and consequently the average substantially constant velocity during the predetermined portion of the stroke of the piston 30 is rapidly achieved.

Under the conditions where the piston 30 is moving in the direction of the arrow 60 at a substantially constant velocity, such a portion of the stroke, as noted above, is termed the predetermined portion of the stroke of the gas powered actuator 20 and for such a condition the flow through the orifice 64 is defined by the following equation:

$$W_f \frac{C_w A_o P_s}{\sqrt{T_s}} \sqrt{\frac{32.2 K}{R} \left(\frac{2}{K+1}\right)^{K+1/K-1}} \quad (1)$$

where:

$W_f$ = gas mass flow through orifice
$C_w$ = orifice discharge coefficient
$A_o$ = orifice area
$P_s$ = pressure of gas in stem chamber
$T_s$ = temperature of gas in stem chamber
$K$ = adiabatic exponent
$R$ = gas constant When the average substantially constant velocity is achieved for the predetermined portions of the stroke of the gas-powered actuator 20, as noted above, the mass flow of gas from the stem chamber 52 through the orifice 64 is equal to that flowing into the driving chamber 54 since both chambers are sealed from regions external the cylinder 26. This relationship is expressed as follows:

$$\rho_s A_{ps} V_a = W_f \quad (2)$$

where:

$\rho_s$ = specific density of gas in stem chamber
$A_{ps}$ = area of piston on stem side
$V_a$ = average velocity Under these flow conditions, as noted above, the flow of gas between the stem chamber 52 and driving chamber 54 is "choked" and this is expressed by the relationship:

$$P_D \leq .528 P_s \qquad (3)$$

where $P_D$ = gas pressure in driving chamber.

The orifice discharge coefficient $C_w$ for the orifice 64 may be readily determined for the particular type of orifice that is utilized.

By substituting the equation of state:

$$\rho = \frac{P}{RT} \qquad (4)$$

the above equations may be solved to determine the relationship between the substantially constant velocity achieved by the piston 30, the area of the first side 32 of the piston 30, and the square root of the absolute temperature of the gas in the stem chamber 52 may be determined. This relationship may be expressed as $$V_a = \frac{K_1 A_o \sqrt{T_s}}{A_{ps}} \qquad (5)$$

where $K_1$ = constant dependent upon $C_w$, R, K and g, the acceleration of gravity.

Therefore, from Equation 5 above, it can be seen that to achieve an average substantially constant velocity during a predetermined portion of the stroke of the gas-powered actuator 20, the area of the orifice 64 is carefully chosen from the above defined equations to provide the equilibrium condition above-mentioned for a given set of operating conditions.

The curves shown on FIGURE 3 illustrate the operating characteristics of the gas-powered actuator 20 and harness reel 16 illustrated on FIGURE 2. As shown thereon, the piston 30 is initially at rest and therefore must accelerate to the substantially constant velocity that is to be achieved. Consequently, during the first portion of travel of the piston 30 it is accelerating. However, since the spring 94 maintains a preselected tension on the strap 14 the load is immediately applied to the piston 30 and consequently the period of acceleration, that is up to that point of the stroke indicated by the line $a$ is comparatively rapid. When the point $a$ of the stroke of the piston 30 is reached, the piston is traveling at a substantially constant velocity, as shown by curve A on FIGURE 3, but, however, there might be a slight override which, as noted above, is highly damped out. At point $b$ of the stroke, a second force might be encountered which, for example, might be a compression of the padding on the seat material in which the wearer of the harness 12 is located and this would cause an initial tendency to have a slight drop in the average velocity followed by a possible slight override. However, these perturbations are rapidly damped out and once again the average substantially constant velocity is achieved until the end of the stroke as indicated by the point $c$.

The curve B on FIGURE 3 illustrates the reel angular velocity which is the angular velocity of the strap shaft 84 as it is being driven by the output shaft 76. Since the piston 30 provides a direct connection to the strap shaft 84 the angular velocity of the reel 16 will follow the linear velocity of the piston 30 and thus the curve B is affine to the curve A.

However, as the strap 14 is wound around the strap shaft 84 the diameter thereof increases somewhat due to the underlying layers of the strap 14. Consequently, for a constant angular velocity as indicated by the curve B the strap linear velocity, as indicated by the curve C, must constantly increase slightly between the points $a$ and $c$ of the stroke. Thus, there is provided a substantially constant velocity applied to the strap 14 the only difference being that due to the difference in diameter of the winding upon the shaft 84 during actuation.

In the application of applicant's invention, as illustrated by the embodiments shown on FIGURE 2, the gas-powered actuator 20 has a cylinder 26 that is fixed with respect to the piston 30 and therefore the piston 30 moves relative to the cylinder 36 to provide actuation of the reel 16. It will be appreciated that in the broad concept of the harness reel arrangement 10 provided by applicant, such relative movement between the piston 30 and the cylinder 26 may be provided by having the piston fixed and the cylinder moving. FIGURE 4 illustrates such an embodiment of applicant's invention. As shown on FIGURE 4 there is a gas-powered actuator 120 which, except for the differences noted below, may be similar to the gas-powered actuator 20 illustrated in FIGURE 2. The gas-powered actuator 120 has a piston 122 having a stem 124 affixed to a first side 126 thereof. The stem 124 has a second end protruding from walls 130 defining a cylinder 132. The second end 128 of the stem 124 is coupled to and, as shown on FIGURE 4, a part of walls 134 which, for example, may be part of a housing 136 that is similar to the housing 22 shown on FIGURE 2.

The cylinder 132 is slidingly movable in the direction indicated by the arrow 138 on the piston 122 and stem 124. In a position shown on FIGURE 4, the cylinder 132 has moved a predetermined distance in a direction indicated by the arrow 138. Seals 140 are provided on the periphery of the piston 122 to provide sliding seal engagement of the piston 122 with the walls 130 of the cylinder 132. Similarly, seals 142 are also provided on the walls 130 of the cylinder 132 which slidingly and sealingly engage the stem 124.

The piston 122 divides the cavity 144 into a stem chamber 146 adjacent the first or stem side 126 of the piston 122 and a driving chamber 148 adjacent a second or driving side 150 of the piston 122.

There is also provided an orifice 151 in the piston 122 to provide a gas flow passage between the stem chamber 146 and the driving chamber 148. The area of the orifice 151 is carefully selected from the equations defined above.

A gas generator 154 which, for example, may be similar to the pyrotechnic container 96 shown on FIGURE 2 is coupled to the fixed housing 136 and the stem 124 has wall portions 156 defining a gas flow passage 158 that provides a gas passage between the gas generator 154 and the stem chamber 146.

Operation of this embodiment of applicant's invention is similar to that described above. When gas under pressure is introduced into the stem chamber 146 through the passageway 158 there is a force exerted on the cylinder 132 against the wall portion 159 thereof in the direction indicated by the arrow 160. Similarly, load and friction forces also act on the cylinder 132 in the direction indicated by the arrow 160. However, as gas flows through the orifice 151 the pressure of the gas in the driving chamber 148 increases to exert a force on the driving face 162 of the cylinder 132 to provide a force in the direction indicated by the arrow 138. When, as noted above, the force in the direction indicated by the arrow 138 equals the sum of the forces acting on the cylinder 132 in the direction indicated by the arrow 160, a substantially constant velocity of the cylinder 132 is achieved.

The cylinder 132 may be coupled to a shaft 164 which, for example, may be similar to threaded shaft 66 of FIG. 2 and the shaft 164 engages a motion converting means 166 which, for example, may be similar to the motion converting means 68 shown in FIGURE 2. Thus, operation of a reel 16 (not shown on FIGURE 4) may be accomplished with the arrangement shown on FIGURE 4 in a manner similar to that for the arrangement shown on FIGURE 2.

As noted above, applicant's improved harness reel arrangement 10 includes not only a gas-powered actuator 20 driving a reel 16 but also, in the preferred embodiment of applicant's invention, a strap-lock 18 for locking the strap to prevent linear movement thereof during subjection to acceleration forces involved in the first class of emergency conditions above-described.

Figure 5:
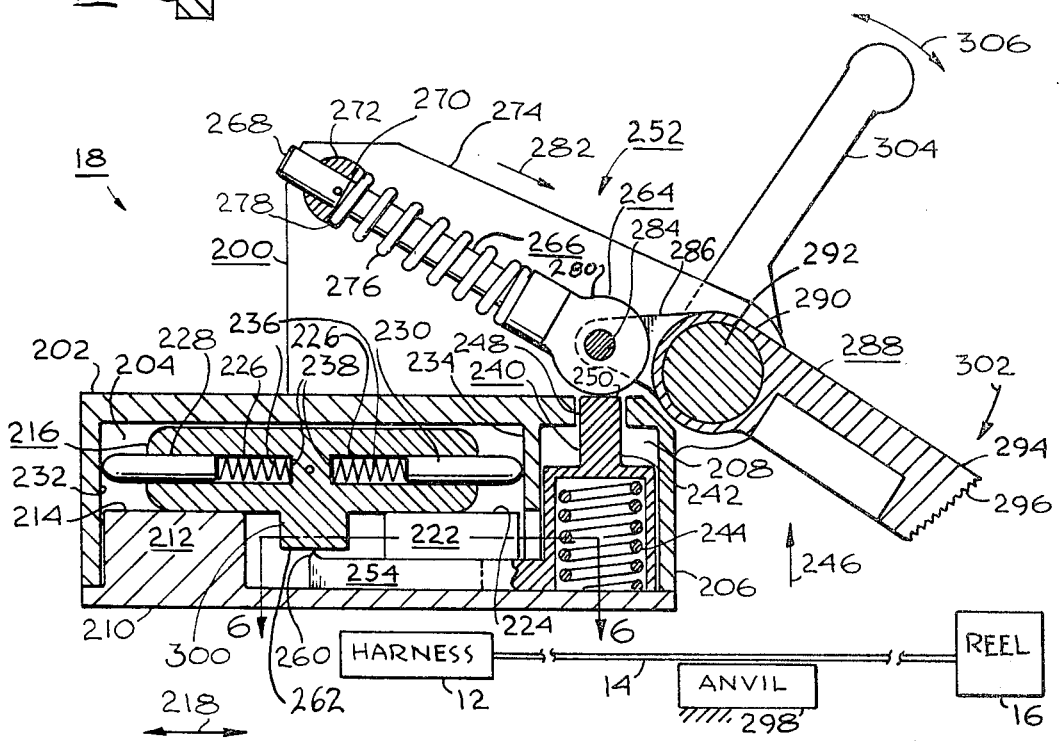
FIGURES 5 and 6 are sectional views of a strap lock useful in the practice of applicant's improved harness reel arrangement.
Figure 6:
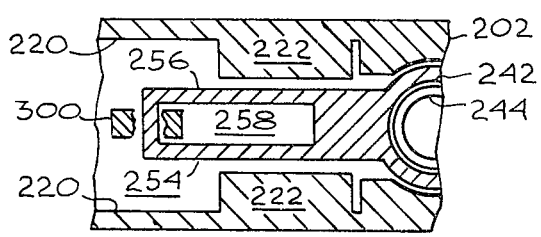

FIGURES 5 and 6 are sectional views of a strap-lock 18 useful in the practice of applicant's improved harness reel arrangement 10. The strap-lock 18 shown in FIGURES 5 and 6 is similar to that described in applicant's co-pending patent application, Ser. No. 549,737, filed simultaneously herewith. The strap-lock arrangement 18 is comprised of a housing 200 having first walls 202 defining an inertia mass cavity 204 and second walls 206 defining an actuator cavity 208. The housing 200 also has a base 210 affixed thereto to close the bottom thereof.

The base 210 has a portion 212 having an upper surface 214 upon which an inertia mass 216 is adapted to slidingly move in reciprocal motion in the directions indicated by the arrow 218. Interior side wall portions 220 of the housing 200 restrict motion of the inertia mass 216 so that it is constrained to move in the direction of the arrow 218. The interior sidewall portions 220 of the housing 200 also have a portion 222 having upper surface 224 upon which the inertia mass 216 is slidingly supported so that the inertia mass 216 slides on the surfaces 214 and 224 in a direction, which may be considered the preselected direction for the embodiment illustrated in FIGURES 5 and 6, indicated by the arrow 218.

Inertia mass 216 is provided with pin receiving apertures 226 in opposite ends thereof and the pin receiving apertures 226 are aligned in the preselected direction indicated by the arrow 218. A pair of pins 228 and 230 are slidingly mounted in the pin receiving apertures 226 and are urged outwardly therefrom to bear against internal wall portions 232 and 234, respectively, of the housing 200 in the inertia mass cavity 204 by inertia mass springs 236. As can be seen from FIGURE 5 the inertia mass springs 236 are intermediate the pins 228 and 230 and the base portions 238 of the pin receiving apertures 226.

As shown in FIGURE 5 applicant's strap locking arrangement 18 is shown in a normally restrained or open position wherein the belt or strap means 14 is adapted to slidingly move therethrough freely without restraint except for the restraint imposed by the spring loaded strap shaft 84 of the reel 16.

Within the actuator cavity 208 there is positioned an actuator means 240 comprising an actuator body member 242 and an actuator spring 244. The actuator spring 244 is intermediate the base 210 and the actuator body member 242 for urging the actuator body member 242 in a direction indicated by the arrow 246. The actuator body member 242 has a first end 248 with a belt-snubbing means engaging surface 250 and is adapted to slidingly engage a belt-snubbing means 252. The belt-snubing maens 252 is described in greater detail below.

As shown more clearly on FIGURE 6, the actuator body member 242 has a second end 254 for sliding engagement with the inertia mass 216. The second end 254 is bifurcated and provided with arm portions 256 that define a channel 258 therebetween. The second end 254 is also provided with an inertia mass engaging surface 260 that slidingly engages an actuator engaging surface 262 of the inertia mass 216.

For the normally restrained position of the belt locking arrangement 18 shown on FIGURES 5, 6, there is provided a normally restrained belt snubbing means as generally indicated by the designation 252. The belt snubbing means 252 has an over-center spring-loaded member 264 comprising a member 266 having a first end 268 that is slidingly mounted for reciprocal motion in an aperture 270 of a first shaft 272. The first shaft 272 is rotatably supported in the flanges 274 of the housing 200. Thus, the member 266 is adapted to both rotate with rotation of the first shaft 272 and also to move reciprocatingly in the aperture 270.

A belt snubbing compression spring means 276 is intermediate a flattened portion 278 of the first shaft means 272 in regions adjacent the radial aperture 270 and abuts against the member 266 in regions adjacent a second end 280 thereof for urging the member 266 outwardly in the direction indicated by the arrow 282 from the first shaft means 272. The second end 280 of the member 266 is also pivotally mounted by pivot pin means 284 to a portion 286 of a belt lock means 288. A first end 290 of the belt lock means 288 is coupled to a second shaft means 292 and is adapted to rotate therewith. The second shaft means 292 is rotatably mounted in the flanges 274 of the housing 200. The belt lock means 288 has a second end 294 having a belt engaging surface 296 thereon that is adapted to lockingly engage the belt or strap means 14 upon actuation of the belt locking arrangement 18 and the belt engaging surface 296 may be provided with a serrated edge as shown to provide better locking engagement.

As shown on FIGURE 5, the member 266 of the belt snubbing means 252 is an over-center spring-loaded member in that in the normally restrained position, as shown on FIGURE 5, the axis of rotation of the first shaft means 272 and the axis of rotation of the pivot pin means 284 are not colinear with the axis of rotation of the second shaft means 292. Consequently, under the urging of spring means 276 the second end 280 of the member 266 bears against the surface 250 of the actuator body member 242 in the normally restrained position and, further, maintains the belt locking member 288 away from belt engaging relationship with an anvil 298. This allows the strap or belt means 14 to pass freely through the belt locking arrangement 18. The over-center spring-loaded arangement provided in the belt snubbing arrangement 252 provides this normally restrained position since the pivot pin means 284 is constrained to move in the arc of a circle defined by its separation from the axis of rotation of the second shaft means 292.

Consequently, the center position or maximum compression exerted on spring means 276 occurs when the axes of rotation of the first shaft means 272, the pivot pin means 284 and the second shaft means 292 are colinear. As described below, under the influence of preselected forces, the belt snubbing means 252 is moved through the above described center position or position of maximum compression of the spring means 276 to allow the spring means 276 to force the belt locking member 288 and the belt engaging surface 296 thereof into belt locking relationship with the anvil 298.

In operation, when the belt locking arrangement 18 is subjected to acceleration forces acting in the direction indicated by the arrow 218, the inertia mass 216 tends to resist the motion produced by the acceleration forces. Consequently, there is relative movement between the inertia mass means 216 and the other structure comprising the inertia lock means 18. Depending upon the magnitude of the acceleration forces encountered and the spring constant of the inertia mass springs 236 the inertia mass 216 will undergo relative movement in the directions indicated by the arrow 218 depending upon the direction that the forces producing such relative motion are acting. When the forces producing such motion exceed a predetermined value, the relative movement will have been sufficient to allow the portion 300 of the inertia mass means 216 to move either between the portion 212 of the base 210 and the second end 254 and terminate the sliding engagement of the actuator engaging surface 262 of the inertia mass means 216 with the inertia mass engaging surface 260 of the actuator body member 242, or it will move in the direction opposite to terminate such engagement and be in the channel 258. In either event, once the sliding engagement of the surface 262 with the surface 260 is terminated the actuator spring means 244 provides movement of the actuator body member 242 in the direction indicated by the arrow 246. Thus, the actuator body member 242 moves the member 266 through the center position thereof and then, under the influence of the compression spring 276 the strap lock means 288 moves in the direction indicated by the arrow 302. Movement of the strap lock means 288 in the direction indicated by the arrow 302 moves the strap engaging surface 296 into strap engaging relationship with the anvil 298 and thereby positively snubs the strap or belt means 14 therebetween.

In the preferred embodiment of the strap lock arrangement shown on FIGURES 4 and 5 applicant includes a handle means 304 that is affixed to the second shaft means 292 and is adapted to rotate therewith. The handle means 304 may be moved in the direction indicated by the arrow 306 and thereby provide manual operation for the locking of the belt or strap means 14 or release and return of the strap lock arrangement 18 to the normally restrained position from the locking position. Thus, inclusion of the handle 304 allows either manual locking by moving the strap lock arrangement 18 from the normally restrained position to the strap locking position or release by moving the strap locking arrangement 18 from the locking position to the normally restrained position.

It will be appreciated that other forms of strap lock arrangements inertia and/or manually operated may be utilized, as desired, in the harness reel arrangement plan of applicant's invention herein.

From the above, it can be seen that applicant has provided an improved harness reel arrangement in which provisions are included for providing restraint to the occupant of a vehicle under various emergency or high force conditions. The improved gas-powered actuator utilized in applicant's harness reel arrangement for driving the harness reel provides a positive restraining force upon the wearer of the harness and which force is not of a magnitude sufficient to harm the wearer of the harness. Such forces imposed by the actuation of the harness reel 16 by the gas-powered actuator 20 restrains the wearer of the harness 12 in the seat or other body supporting structure that may be utilized. Further, applicant's improved strap lock 18 utilized in the harness reel arrangement 10 allows either manual or automatic locking of the strap to prevent extension or retraction thereof during other emergency conditions of a less severe nature.

Those skilled in the art may find many variations and adaptions of applicant's improved harness reel arrangement. Therefore, the following claims are intended to cover all such variations and adaptations falling within the true scope and spirit of applicant's invention.

What is claimed as new and desired to be secured by Letters Patent of the United States is:

1. A gas powered harness reel arrangement comprising, in combination:
   a substantially constant velocity gas powered actuator having a preselected linear stroke for providing an average, substantially constant velocity during predetermined portions of said stroke;
   an output shaft;
   means engaging said actuator and said output shaft for converting said linear stroke movement of said actuator to rotary motion of said output shaft;
   a strap shaft adapted to have a strap wound thereupon;
   means for yieldingly resisting rotation in a first direction of said strap shaft;
   rotary motion transfer means for rotating said strap shaft in a second direction opposite said first direction in response to rotation of said output shaft; and
   means for providing a gas under pressure to said actuator to provide said preselected linear stroke, whereby said strap shaft is rotated in said second direction at a substantially constant angular velocity.

2. The arrangement defined in claim 1 wherein said substantially constant velocity gas powered actuator comprises:
   a cylinder having walls defining a cavity;
   a gas powered piston slidingly mounted in said cavity for reciprocal motion therein;
   a stem means having a first end coupled to a first side of said piston and a second end extending through said walls of said cylinder to regions external said cylinder, and said piston of the type adapted to move at an average substantially constant velocity during a predetermined portion of the linear movement of said piston from a first to a second end of said cylinder;
   an orifice extending through said piston from said first side to a second side thereof, and said orifice having a preselected area;
   and said means for providing gas into said actuator comprises means for admitting a gas under pressure into said cavity on said first side of said piston.

3. The arrangement defined in claim 2 wherein said means engaging said constant velocity gas powered actuator engages said second end of said stem means, and said cylinder is fixed relative thereto.

4. The arrangement defined in claim 2 wherein said means engaging said constant velocity gas powered actuator engages said cylinder and said second end of said stem means is fixed to fix said stem and said piston relative to said cylinder.

5. The arrangement defined in claim 2 wherein said means engaging said constant velocity gas powered actuator and said output shaft comprises a recirculating ball driver arrangement, said means for yieldingly resisting rotation in a first direction of said strap shaft comprises a helically wound spring means and said rotary motion transfer means comprises a gear train.

6. The arrangement defined in claim 1 and further comprising:
   a strap means wound upon said strap shaft and having a first end affixed thereto and a second end spaced therefrom;
   a body harness;
   said second end of said strap means connected to said harness;
   an inertia actuated lock means intermediate said harness and said strap shaft for selectively locking said strap upon subjection to preselected external forces;
   and said means for admitting gas into said constant velocity gas powered actuator comprises;
   a pyrotechnic charge;
   a container for said pyrotechnic charge;
   means providing a gas flow path between said container and said constant velocity gas powered actuator for conducting gas from the interior of said container into said constant velocity gas powered actuator;
   and means for igniting said pyrotechnic charge for initiating the generation of a gas under pressure from the deflagration of said pyrotechnic charge, whereby said gas powers said actuator to provide said linear motion.

7. The arrangement defined in claim 5 and further comprising:
   a strap means having a first end affixed to said strap shaft and said strap means wound upon said strap shaft, and a second end remote from said first end;
   a body harness;
   said second end of said strap shaft coupled to said body harness;
   an inertia actuated lock means intermediate said harness and said strap shaft for engaging said strap means to stop movement thereof upon the application of preselected external forces;
   and means for the wearer of said body harness to initiate actuation of said pyrotechnic charge whereby said gas generated from deflagrations of said pyrotechnic charge causes said substantially constant velocity movement during preselected portions of said stroke to wind said strap means on said strap shaft at a substantially constant angular velocity for moving said body harness and the wearer thereof in a preselected direction.

8. The arrangement defined in claim 3 wherein:
said piston divides said cavity of said cylinder into a stem chamber adjacent said first surface of said piston and a driving chamber adjacent said second surface of said piston, and said first surface of said piston has a first preselected area and said second surface of said piston has a second preselected area greater than said first preselected area;

and gas is admitted under pressure into said stem chamber and bleeds through said orifice into said driving chamber at a predetermined flow rate and the pressure of said gas in said driving chamber provides movement of said piston and said stem means relative to said chamber at an average substantially constant velocity during a predetermined portion of the stroke thereof, and said preselected area of said orifice is directly proportional to the product of said area of said first side of said piston multiplied by the average substantially constant velocity, and inversely proportional to the square root of the absolute temperature of the gas in said stem chamber.

9. The arrangement defined in claim 8 wherein the average substantially constant velocity of movement of said piston during said predetermined portions of said stroke thereof is substantially independent of load forces on said piston during said predetermined portion of said stroke for the condition of the magnitude of said load forces being less than a predetermined value.

References Cited

UNITED STATES PATENTS

| | | | |
|---|---|---|---|
| 3,077,324 | 2/1963 | Strickland | 242—107.4 X |
| 3,178,225 | 4/1965 | Bayer | 297—386 |
| 3,189,296 | 6/1965 | Wrighton et al. | 242—107.4 |

WILLIAM S. BURDEN, *Primary Examiner.*